United States Patent [19]

Pfalzgraf et al.

[11] Patent Number: 4,461,254

[45] Date of Patent: Jul. 24, 1984

[54] DEVICE FOR CONTROLLING THE POSITION OF AN ELEMENT WHICH CONTROLS THE FUEL-AIR MIXTURE

[75] Inventors: Manfred Pfalzgraf, Birstein; Kurt Probst, Schwalbach, both of Fed. Rep. of Germany

[73] Assignee: VDO Adolf Schindling AG, Frankfurt am Main, Fed. Rep. of Germany

[21] Appl. No.: 403,183

[22] Filed: Jul. 29, 1982

[30] Foreign Application Priority Data

Aug. 13, 1981 [DE] Fed. Rep. of Germany ....... 3131996

[51] Int. Cl.³ ............................................. F02D 11/10
[52] U.S. Cl. .................................... 123/350; 123/396; 123/399; 180/335
[58] Field of Search ............... 123/350, 396, 399, 340; 180/335

[56] References Cited

U.S. PATENT DOCUMENTS 3,777,174 12/1973 Butscher et al. ...................... 123/350
3,916,854 11/1975 Barton et al. ......................... 123/350
4,278,059 7/1981 Collonia ............................... 123/399

FOREIGN PATENT DOCUMENTS 2068456 8/1981 United Kingdom ................ 123/396

*Primary Examiner*—Andrew M. Dolinar
*Attorney, Agent, or Firm*—Martin A. Farber

[57] ABSTRACT

The present invention relates to a device for controlling the position of an element of an automobile internal combustion engine which controls the fuel-air mixture, comprising a desired-value transmitter 2 for producing an electric desired-value signal which can be fed to a electronic control unit 14. A setting member 19 for displacing a throttle valve 20 into a position corresponding to the position of the desired-value transmitter 2 can be controlled by the electronic control unit 14. In order to make smooth starting possible, a controller unit 15, by which the control of the setting member 19 is regulated upon the starting, is arranged between the desired-value transmitter 2 and the electronic control unit 14.

16 Claims, 4 Drawing Figures

DEVICE FOR CONTROLLING THE POSITION OF AN ELEMENT WHICH CONTROLS THE FUEL-AIR MIXTURE

The present invention relates to a device for controlling the position of an element which controls the fuel-air mixture of an internal combustion engine of an automotive vehicle, having a desired-value transmitter for producing an electric desired-value signal. The signal is fed to an electronic control unit by which a setting member, for displacing the element controlling the fuel-air mixture into a position corresponding to the signal of the desired-value transmitter, can be controlled.

In such known arrangements the desired-value transmitter consists of a potentiometer which can be adjusted by the driver by means of the gas pedal. A corresponding signal is fed to the electronic control unit in accordance with the position of the potentiometer. The electronic control unit controls an electromotive setting member in such a manner that the element which controls the fuel-air mixture, and which may be a throttle valve, is brought into a position which corresponds to the position of the gas pedal.

Upon starting, this can have the result that there is a starting jerk of the car when a signal corresponding to too high a desired value is fed to the electronic control unit and the setting member is adjusted accordingly by it.

The proper determination of the desired value upon starting is, however, difficult since the driver can do this only on basis of a sense of feel.

It is particularly difficult to produce jerk-free starting in the case of commercial vehicles which themselves are of substantial weight and in addition to which there is also a greatly varying weight of load.

In this connection, the difficulty is further increased if the starting is to take place uphill.

Substantially smooth starting, however, is necessary if sensitive cargo or persons are to be carried.

The object of the invention therefore is to provide a device of this type which permits of smooth starting.

This object is achieved in accordance with the invention by the provision between the desired-value transmitter (2) and the electronic control unit (14) of a controller unit (15) by which, upon displacement of the desired-value transmitter (2) from its end position corresponding to a speed of travel of zero, the change in the value of the desired-value signal per unit of time can be limited below a given speed of travel to a maximum value. By the development in accordance with the invention, a smooth increase of the signal fed to the electronic control unit takes place during starting even with a desired value which is set to a high value at the gas pedal, thus obtaining a smooth jerk-free start up to a speed of travel as from which the control of the setting member can take place in traditional manner without producing a jerk. In this way the driver can, upon starting, bring the gas pedal into the full-throttle position without producing a jerk upon starting.

The maximum value to which the change in value of the desired-value signal per unit of time can be limited is preferably an adjustable, or presettable, constant value which is determined in a manner specific to each car.

In one advantageous development of the invention, the change in the value of the desired-value signal per unit of time can be limited starting from a value which corresponds to the maximum position of the desired-value transmitter (2) at which the speed of travel is zero. This means that when a high desired value is set, the setting member can immediately pass, without limitation of its speed of adjustment, into a position in which the vehicle still does not start into motion due to the various resistances which must be overcome, such as weight of vehicle, frictional loss in transmission, and slippage of tires. Only from this point on, above which the vehicle starts to move, is the change in the size of the desired-value signal per unit of time limited to the maximum value until the specific speed of travel is reached.

The value, up to which the change in the value of the desired-value signal per unit of time can take place without limitation, may be an adjustable, or presettable, constant value which is determined in a manner specific to the car, in which connection the weight of the car is particularly to be taken into consideration.

This value may, however, also be a variable value which is automatically adjustable as a function of the total weight of the vehicle. In this way the optimum starting process is obtained automatically under any condition of loading of the vehicle.

The controller unit (15) may have an integrating stage (16) by which the change in the size of the desired-value signal per unit of time can be limited.

If the change of the size of the desired-value signal per unit of time is to be limited only starting from a given value, then the controller unit (15) can furthermore have a limiting stage (17), the output values of the integrating stage (16) and of the limiting stage (17) being adapted to be fed to an addition stage (18) and the output thereof to the electronic control unit (14). This development has the advantage that the starting process can take place immediately and it is not necessary to wait until the desired value signal which increases with limited rise has reached a value at which the car starts to move.

The speed of the car can be noted by a speed transmitter (7) and be converted into an electric speed signal.

The speed signal can be fed to one input (10) of a speed comparator and a signal corresponding to the given speed of travel to a second input (11) thereof, the comparator giving off an output signal if the speed signal is larger than the given travel speed signal from which the electronic control unit again operates in traditional manner. In this connection the speed comparator may be a threshold switch (8). Thus, when the given speed of travel is reached, a signal is produced by which switching is effected from limited to unlimited control of the setting member. The desired-value signal can be fed to one input (9) of a desired value comparator and an electric constant signal corresponding to the maximum position at which the speed of travel is zero to a second input (12) thereof, an output signal being given off by the desired-value comparator, when the desired-value signal is larger than the constant signal. In this case also the desired value comparator can be a threshold switch (3). The desired value comparator thus gives off a signal only when the desired-value signal entering into it is greater than the constant value present at its other input.

The output of the speed comparator and the output of the desired-value comparator can be connected to a switch unit (5) by which a desired-value signal of the desired-value transmitter (2) can be fed to the controller unit (15) when an output signal of the desired value comparator is present and an output signal of the speed comparator is not present. Thus speed comparator and desired-value comparator clearly determined the criteria under which the controller unit is placed in operation.

The output of the desired-value comparator can be connected to a second switch unit (4) by which the output of the desired-value transmitter (2) can be connected to the electronic control unit (14) when no output signal from the desired-value comparator is present. In this way the desired-value signal is then fed directly to the electronic control device when the desired value is smaller than the maximum acceleration value set on the desired-value comparator. This is also possible without difficulty since no starting jerk can occur with such slight acceleration.

The output of the speed comparator can be connected to a third switch unit (6) by which the output of the desired-value transmitter (2) can be connected to the electronic control unit (14) when an output signal of the speed comparator is present. As a result the desired-value signal is fed directly to the electronic control device when the starting process is at an end and the given speed has been exceeded. After the process of regulated starting control, traditional control of the acceleration can then be effected during normal travel. A regulated starting control in accordance with the principles of the known acceleration control is not possible since the low speed of travel present during the starting cannot be measured in an economically feasible manner.

With the above and other objects and advantages in view, the present invention will become more clearly understood in connection with the detailed description of a preferred embodiment, when considered with the accompanying drawings, of which:

Figure 1:
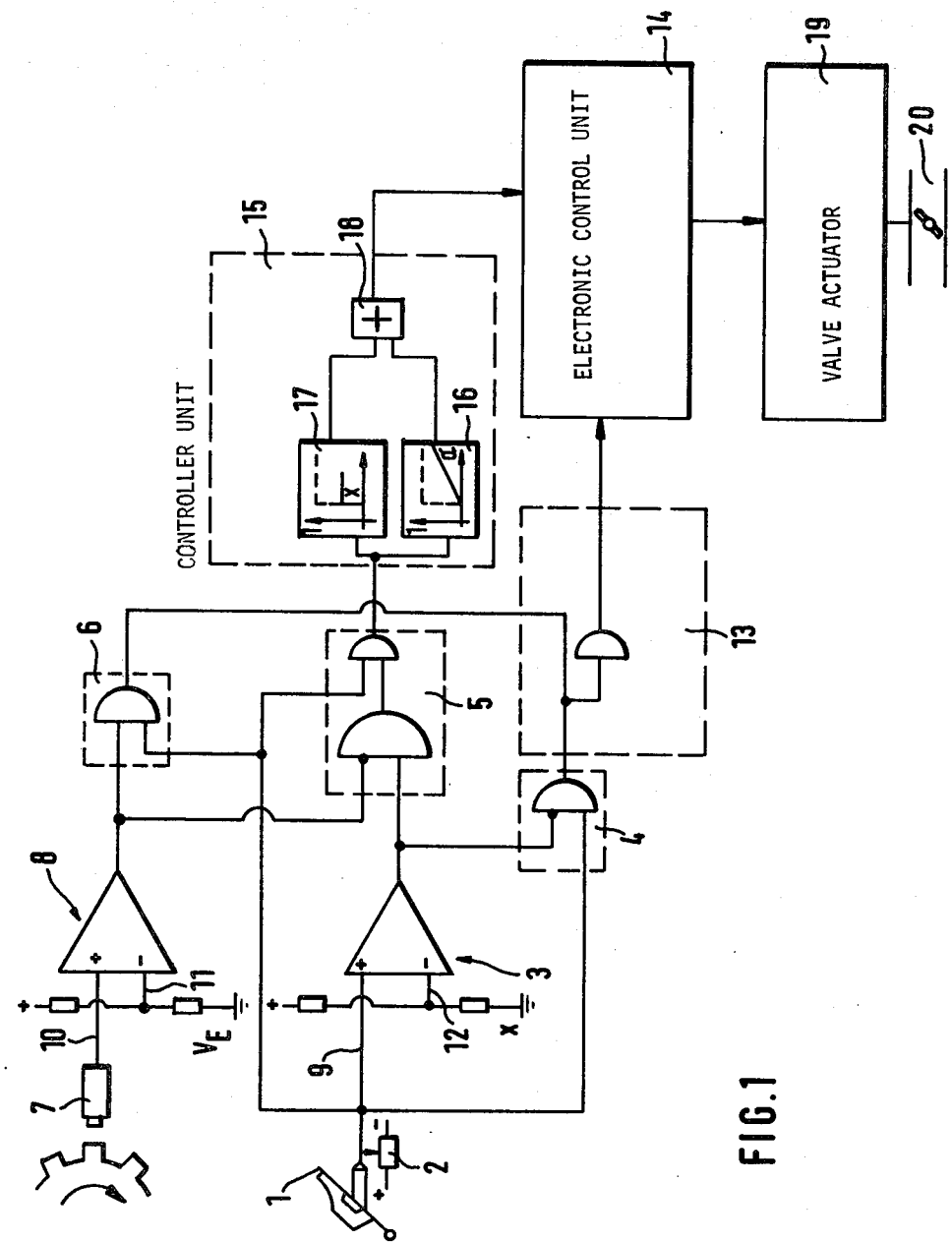
FIG. 1 is a circuit diagram of a device in accordance with the invention.

The device shown in FIG. 1 has a desired-value transmitter 2 which can be adjusted by the driver by means of a gas pedal 1 and which is developed as a potentiometer.

The output of the desired-value transmitter 2 is connected with one input 9 of a threshold value switch 3, with a switch unit 4, with a switch unit 5, and with a switch unit 6.

The output of a speed detector/transmitter 7, which notes the speed of travel is connected to one input 10 of a threshold switch 8.

The second input 11 of the threshold switch 8 is acted on by a constant electric magnitude which corresponds to a given speed, while the second input 12 of the threshold switch 3 is acted on by a constant electric magnitude which corresponds to the maximum position of the desired-value transmitter at which the car is not yet in motion and therefore still has a zero speed of travel.

The output of the threshold switch 8 is connected to the switch unit 6 by which a connection from the desired value transmitter 2 can be effected via a connecting stage 13, to an electronic control unit 14 when a signal is given off at the output of the threshold switch 8.

The output of the threshold switch 3 is connected to the switch unit 4 via which a connection can also be made from the desired-value transmitter 2 to the connecting stage 13 and to the electronic control unit 14. This connection is open when no signal is given off by the threshold switch 3.

Furthermore, the outputs of the two threshold value switches 3 and 8 are connected to the switch unit 5. As already stated, the switch unit 5 is also connected to the desired-value transmitter 2.

This switch unit 5 opens the connection from the desired-value transmitter 2 to a controller unit 15 when a signal is fed here from the threshold switch 3 but no signal is present from the threshold switch 8.

The controller unit 15 has an integrating stage 16 and a limiting stage 17, to each of which the connection with the desired-value transmitter 2 extends.

The outputs of the integrator stage 16 and the limiting stage 17 are fed to an addition stage 18 which is also present in the controller unit 15 and the output of which is fed to the electronic control unit 14.

The electronic control unit 14 thus receives, either the desired-value signal given off by the desired-value transmitter 2 directly via the connecting stage 13, or a signal prepared by the controller unit 15.

Depending on the size of these signals, the electronic control unit 14 controls the setting member 19 for the displacement of a throttle valve 20.

The function of the device in accordance with the invention will be described below with reference to the graphs shown in FIGS. 2, 3 and 4.

Figure 2:
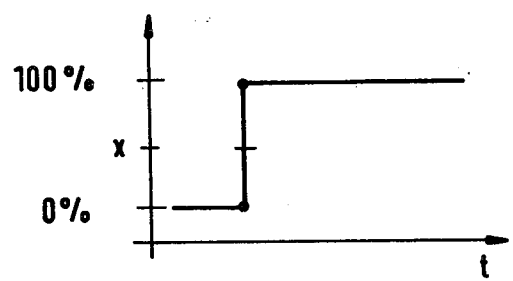
FIG. 2 is a graph showing the displacement of the desired-value transmitter with time.
Figure 3:
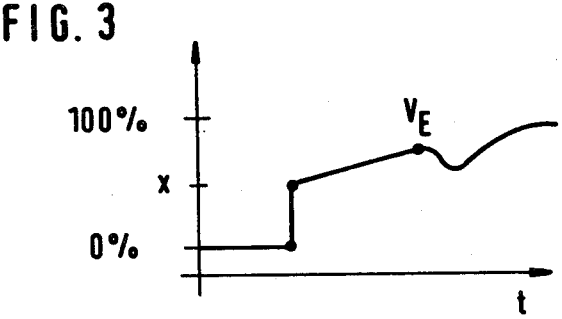
FIG. 3 is a graph showing the displacement of the setting member with time corresponding to the displacement of the desired value in accordance with FIG. 2.

The displacement between the idle position (0%) and the full-throttle position (100%) with respect to time is shown for the desired-value transmitter 2 in FIG. 2 and for the setting member 19 in FIG. 3.

Figure 4:
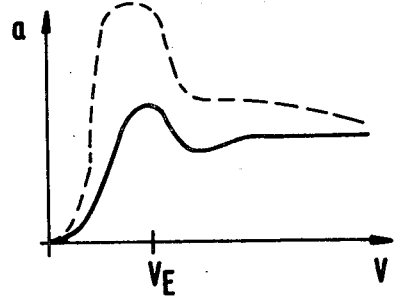
FIG. 4 is a graph showing the change in acceleration with speed.

FIG. 4 shows the variation of acceleration a with the speed V during the starting process. In this case, the course of the acceleration in accordance with the prior art is shown in dashed line and the course of acceleration in accordance with the invention in solid line.

If a high desired value is set on the desired value transmitter 2 upon starting, for instance by depressing the gas pedal 1 all the way, then the desired value transmitter 2 gives off a desired-value signal of 100%. This can be noted in FIG. 2. This desired-value signal is clearly above the value x.

This value x is present as constant signal at the one input of the threshold switch 3 and corresponds to the maximum position of the desired-value transmitter at which the speed of travel is still zero.

Since the desired-value signal is greater than this constant signal, an output signal is given off by the threshold switch 3 and fed both to the switch unit 5 and to the switch unit 4. The forward direction of the switch unit 4 is thereby blocked.

At the same time the speed of travel is still zero so that the speed signal fed by the speed transmitter to the threshold switch 8 is less than the specific travel speed signal present at the other input of the threshold switch 8. This given travel speed signal corresponds to a fixed speed of travel below which regulated control and above which normal traditional control of the setting member 19 is to take place. This fixed speed of travel is designated $V_E$.

Since the speed signal is less than $V_E$, the threshold switch 8 does not give off any signal.

The forward direction of the switch unit 6 is thus blocked.

Since a signal is present from the threshold switch 3 on the switch unit 5 but no signal is present from the threshold switch 8, the forward direction of the switch unit 5 is opened and the desired-value signal from the desired-value transmitter 2 acts on the integrating stage 16 and the limiting stage 17 of the controller unit 15.

This desired-value signal, which is very high due to the full-load position of the desired-value transmitter 2, is limited by the limiting stage 17 to a value which corresponds to the value x and is conducted to the addition stage 18.

The desired-value signal is so treated by the integration stage 16 that its course with respect to time corresponds to the shape of the curve shown in FIG. 3 above the value x.

The signals given off by the limiting stage 17 and the integrating stage 16 are added in the addition stage 18 and forwarded to the electronic control unit 14.

The addition of these signals is shown in FIG. 3, the vertical ascent of the curve up to the value x being formed by the limiting stage 17. This value remains constant over the course of time. The values of the integrating stage 16 which rise with the passage of time and are added thereto lead to the shape of the curve shown.

If a position of the setting member 19 is reached which corresponds to the travel speed $V_E$ set at the threshold switch 8, an output signal is given off by the threshold switch 8 to the switch units 5 and 6.

This has the result that the forward direction of the switch unit 5 is blocked and the forward direction of the switch 6 opened.

In this way the controller unit 15 no longer is acted on, while the desired-value signal passes via the switch unit 6 and the connecting stage 13 directly to the electronic control unit 14.

The latter can now control the setting member 19 for the displacement of the throttle valve 20 in traditional fashion.

The regulated control of the setting member 19 which has been described leads to the curve shown in FIG. 4 which clearly shows that regardless of the setting of a high desired value during the starting process the acceleration rise is limited to values which assure a smooth starting.

On the other hand, if the desired value set is smaller at the start of the driving than the constant signal fixed by the value x at the threshold switch 3, then the threshold switch 3 does not give off any output signal. In this way the switch unit 4 is opened for passage and the desired-value signal can pass via the connecting stage 13 directly to the electronic control unit 14. At the same time the forward directions of the switch units 5 and 6 are blocked.

Upon an increase of the desired value and simultaneous increase in the speed below the rate of increase determined by the integration stage 16, the value x is exceeded at the threshold switch 3 ad the value $V_E$ at the threshold switch 8. This has the result that the forward direction of the switch unit 5 continues to be blocked, the forward direction of the switch unit 4 is blocked and the forward direction of the switch unit 6 is opened.

The desired-value signal thus passes directly from the desired value transmitter 2 via the switch unit 6 and the connecting stage 13 to the electronic control unit 14.

The signal applied by switch unit 5 is a logic type signal. If controller unit 15 is acted on by switch unit 5 controller unit 15 creates a variable analog voltage which is supplied to the electronic control unit 14.

The signal applied by connecting stage 13 is also a logic type signal.

If there is a signal on the output of connecting stage 13 than the control unit 14 is supplied by the analog signal which is created by the transmitter 2 via a not shown line.

We claim:

1. In a device for controlling the position of an element which controls the air-fuel mixture of an internal combustion engine of an automotive vehicle, the device having a desired value transmitter for signaling a desired value of speed, the desired value transmitter producing an electric desired value signal which can be fed to an electronic control unit by which there can be controlled a setting member for displacing the element which controls the air-fuel mixture into a position corresponding to the desired value signal, the improvement wherein controller means are provided between the desired value transmitter and the electronic control unit, said improvement further comprising speed transmitter means for detecting and converting the speed of the vehicle into an electric speed signal;

means for sensing the amplitude of said speed signal and the amplitude of said desired value signal;

switching means coupled to said sensing means and responsive to the amplitude of the desired value signal and to the amplitude of the electric speed signal for selectively switching the desired value signal between said controller means and said control unit; and wherein said controller means, upon displacement of the desired value transmitter from an end position thereof corresponding to a speed of travel of zero, limiting the change in the value of the desired value signal per unit of time, below a given speed of travel, to a maximum value.

2. The device as set forth in claim 1, wherein said maximum value is a presettable constant value.

3. The device as set forth in claim 1, wherein the change in the value of the desired value signal per unit of time is limited, starting from a value which corresponds to a maximum position of the desired value transmitter at which the speed of travel is zero.

4. The device as set forth in claim 3, wherein said value, up to which the change in the value of the desired value signal per unit of time takes place without limitation, is a presettable constant value.

5. The device as set forth in claim 3, wherein said value can be varied.

6. The device as set forth in claim 3, wherein said value can be adjusted to compensate for the total weight of the vehicle.

7. In a device for controlling the position of an element which controls the air-fuel mixture of an internal combustion engine of an automotive vehicle, the device having a desired value transmitter for signaling a desired value of speed, the desired value transmitter producing an electric desired value signal which can be fed to an electronic control unit by which there can be controlled a setting member for displacing the element which controls the air-fuel mixture into a position corresponding to the desired value signal, the improvement wherein
  controller means are provided between the desired value transmitter and the electronic control unit,
  said controller means, upon displacement of the desired value transmitter from an end position thereof corresponding to a speed of travel of zero, limiting the change in the value of the desired value signal per unit of time, below a given speed of travel, to a maximum value, and wherein
  said controller means has an integrating means for limiting the change in the value of the desired value signal per unit of time.

8. The device as set forth in claim 7, wherein
  said controller means has a limiting stage and an addition stage, the output values of the integrating means and of the limiting stage being fed to the addition stage, and the output of the addition stage being fed to the electronic control unit.

9. The device as set forth in claim 1, wherein said switching means comprises
  means for coupling the speed signal to the controller means.

10. The device as set forth in claim 9, wherein said sensing means includes a speed comparator, and wherein
  the speed signal is fed to one input of the speed comparator and a given speed signal corresponding to the given speed of travel is fed to a second input of the speed comparator, the comparator giving off an output signal if the speed signal is larger than the given speed signal.

11. The device as set forth in claim 10, wherein
  the speed comparator is a theshold switch.

12. In a device for controlling the position of an element which controls the air-fuel mixture of an internal combustion engine of an automotive vehicle, the device having a desired value transmitter for signaling a desired value of speed, the desired value transmitter producing an electric desired value signal which can be fed to an electronic control unit by which there can be controlled a setting member for displacing the element which controls the air-fuel mixture into a position corresponding to the desired value signal, the improvement wherein
  controller means are provided between the desired value transmitter and the electronic control unit,
  said controller means, upon displacement of the desired value transmitter from an end position thereof corresponding to a speed of travel of zero, limiting the change in the value of the desired value signal per unit of time, below a given speed of travel, to a maximum value; said improvement further comprising
  speed transmitter means for detecting and converting the speed of the vehicle into an electric speed signal,
  means for coupling the speed signal to the controller means, said coupling means further comprising a speed comparator, and wherein
  the speed signal is fed to one input of the speed comparator and a given speed signal corresponding to the given speed of travel is fed to a second input of the speed comparator, the comparator giving off an output signal if the speed signal is larger than the given speed signal; and wherein said coupling means further comprises a desired value comparator, and wherein
  the desired value signal is fed to one input of the desired value comparator and an electric constant signal corresponding to a maximum position of the desired value transmitter at which maximum position the speed of travel is zero is fed to a second input thereof, an output signal being given off by the desired value comparator when the desired value signal is larger than the constant signal.

13. The device as set forth in claim 12, wherein
  said desired value comparator is a threshold switch.

14. The device as set forth in claim 12, wherein said coupling means further comprises
  a switch unit connected to the output of the speed comparator and the output of the desired value comparator, the desired value signal of the desired value transmitter being fed to the controller means by the switch unit when an output signal of the desired value comparator is present and an output signal of the speed comparator is not present.

15. The device as set forth in claim 14, wherein said coupling means further comprises
  a second switch unit which is connected to the output of the desired value comparator, the output of desired value transmitter being connected to the electronic control unit by the second switch unit when no output signal of the desired value comparator is present.

16. The device as set forth in claim 15, wherein said coupling means further comprises
  a third switch unit which is connected to the output of the speed comparator, the output of the desired value transmitter being connected to the electronic control unit by the third switch unit when no output signal of the speed comparator is present.

* * * * *